(12) United States Patent
Yen

(10) Patent No.: US 7,929,226 B2
(45) Date of Patent: Apr. 19, 2011

(54) LENS MODULE

(75) Inventor: Shih-Chieh Yen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 22 days.

(21) Appl. No.: 12/487,557

(22) Filed: Jun. 18, 2009

(65) Prior Publication Data

US 2009/0316278 A1    Dec. 24, 2009

(30) Foreign Application Priority Data

Jun. 20, 2008    (CN) .......................... 2008 1 0302261

(51) Int. Cl.
    *G02B 7/02* (2006.01)
(52) U.S. Cl. .......................... 359/819; 359/826; 359/716

(58) Field of Classification Search .......... 359/713–716, 359/811–830, 642
See application file for complete search history.

(56) References Cited

U.S. PATENT DOCUMENTS

| | | | | |
|---|---|---|---|---|
| 4,662,717 A | * | 5/1987 | Yamada et al. | 359/362 |
| 5,249,082 A | * | 9/1993 | Newman | 359/813 |
| 2005/0264670 A1 | * | 12/2005 | Yamaguchi et al. | 348/335 |
| 2007/0201151 A1 | * | 8/2007 | Schletterer et al. | 359/819 |

* cited by examiner

*Primary Examiner* — Darryl J Collins
(74) *Attorney, Agent, or Firm* — Raymond J. Chew

(57) ABSTRACT

A lens module used in a portable electronic device, including a barrel with two ends, and a first lens and a second lens received in the barrel. A third lens is positioned proximal to one end of the barrel, which has a fastening member and an engaging member, wherein the engaging member is accommodated with the fastening member to compactly couple the third lens with the end of the barrel. The third lens is fastened on the one end of the barrel to reduce the overall volume of the lens module.

12 Claims, 5 Drawing Sheets

LENS MODULE

BACKGROUND

1. Technical Field

The present application is related to a lens module, and particularly to a lens module in a portable electronic device.

2. Description of Related Art

Digital cameras are widely applied to portable electronic devices, such as cell phones, notebooks and personal digital assistants (PDA). However, a lens module for a digital camera capable of producing high definition pictures may need at least three lenses. In the three lenses, the diameter of one of the lenses proximal to an image sensor is larger than the diameter of other two lenses to meet optical requirements. Therefore, the internal diameter of the barrel must be the diameter of the lens proximal to the image sensor, resulting in a large volume of the barrel, and accordingly, of the portable electronic device. Thus, a small lens module for a portable electronic device is required.

DETAILED DESCRIPTION

Figure 1:
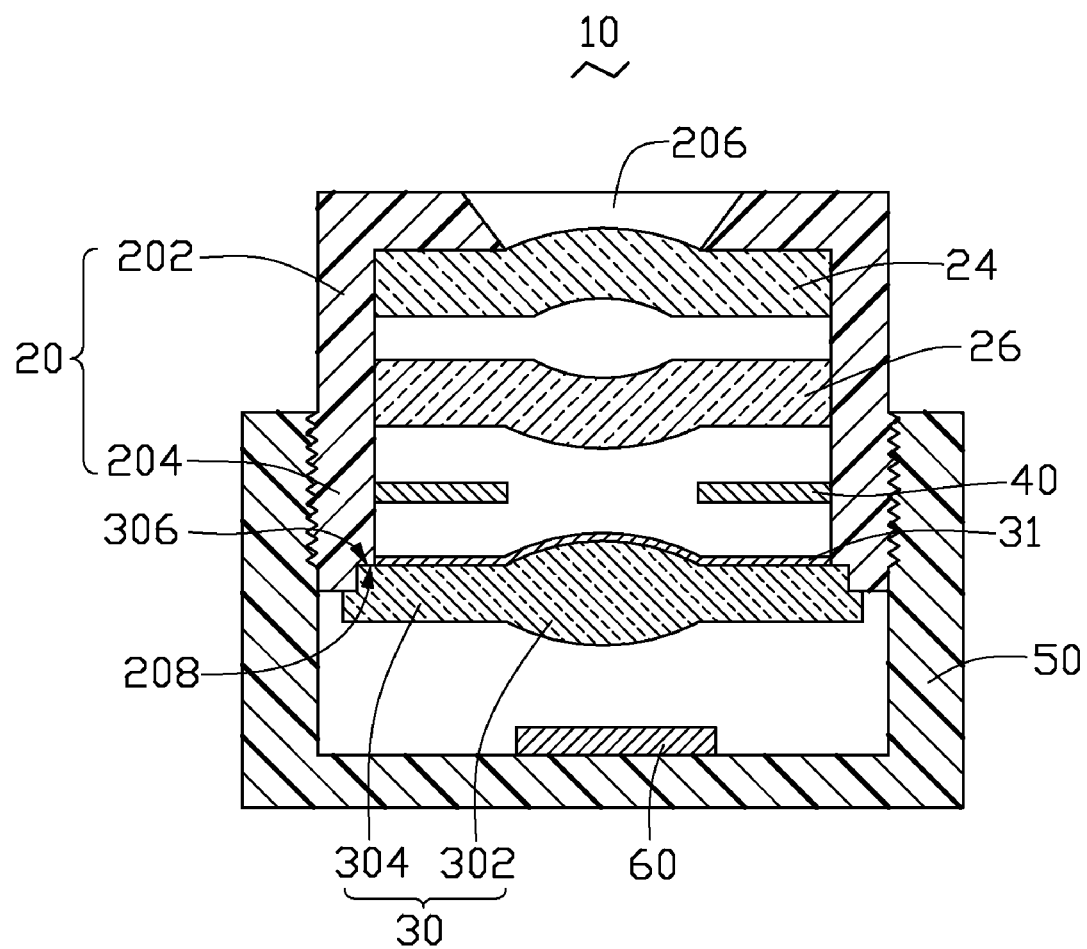
FIG. 1 is a cross-section of a first embodiment of a lens module for a portable electronic device.

Please refer to FIG. 1, which shows an exemplary lens module 10 disclosed by the present disclosure. The lens module 10 comprises a barrel 20 having a male thread, a first lens 24 and a second lens 26 received in the barrel 20, a third lens 30 at one end of the barrel 20, a view stop 40 received in the barrel 20 and positioned between the second lens 26 and the third lens 30, a holder 50 having a female thread engaged with the male thread of the barrel 20, and an image sensor device 60 received in the holder 50.

The barrel 20 has a first end 202 and a second end 204 opposite to the first end 202. The first end 202 has an aperture stop 206 to control the luminous flux of light injecting into the barrel 20.

An engaging member 208 is positioned on the periphery of the second end 204 of the barrel 20. The third lens 30 has an optical member 302 and a non-optical member 304 surrounding the optical member 302. A fastening member 306 positioned on the periphery of the non-optical member 304 engages the engaging member 208 of the barrel 20 to compactly couple the third lens 30 with the barrel 20. The diameter of the third lens 30 is less than or equals the outer diameter of the barrel 20, and exceeds the internal diameter of the barrel 20 to protect the third lens from damage when the holder 50 receives the barrel 20.

The engaging member 208 comprises annular rectangle-shaped protrusions, and the fastening member 306 comprises annular rectangle-shaped recesses. A contact surface between the engaging member 208 and the fastening member 306 is vertical. The third lens 30 can be formed as a dual aspheric surface plastic lens. An infrared filter film 31 is provided on one surface of the third lens opposite to the second lens 24 to prevent infrared light from injecting into the image sensor device 60 when a user takes a picture.

When assembling the lens module 10, the engaging member 208 of the barrel 20 and the fastening member 306 of the third lens 30 contact each other closely to fasten the barrel 20 and the third lens. For better stability, gel can be applied between the engaging member 208 and the fastening member 306. The contact surface of the engaging member 208 and the fastening member 306 can also be provided as an inclined plane. Because the third lens 30 is fastened on an end surface of the second end 204 of the barrel 20 instead of being provided inside the barrel 20, the volume of the barrel 20 is reduced. The third lens can be a spherical surface lens or an aspherical lens, in one example.

The first lens 24 and the second lens 26 can be spherical, aspherical, or bi-aspherical surface plastic lenses, depending on the embodiment. The first lens 24 and the second lens 26 can be separate from each other, or contact each other and form an integral body. The number of lenses received here inside the barrel 20 in the embodiment are only illustrated as an example, and not a limitation to the present disclosure.

The view stop 40 is annular and provided between the third lens 30 and the second lens 26. The view stop 40 can limit light passing through the third lens 30 and into the image sensor device 60, and prevents ghost images and light spots resulting from light scattering and light reflection.

Figure 2:
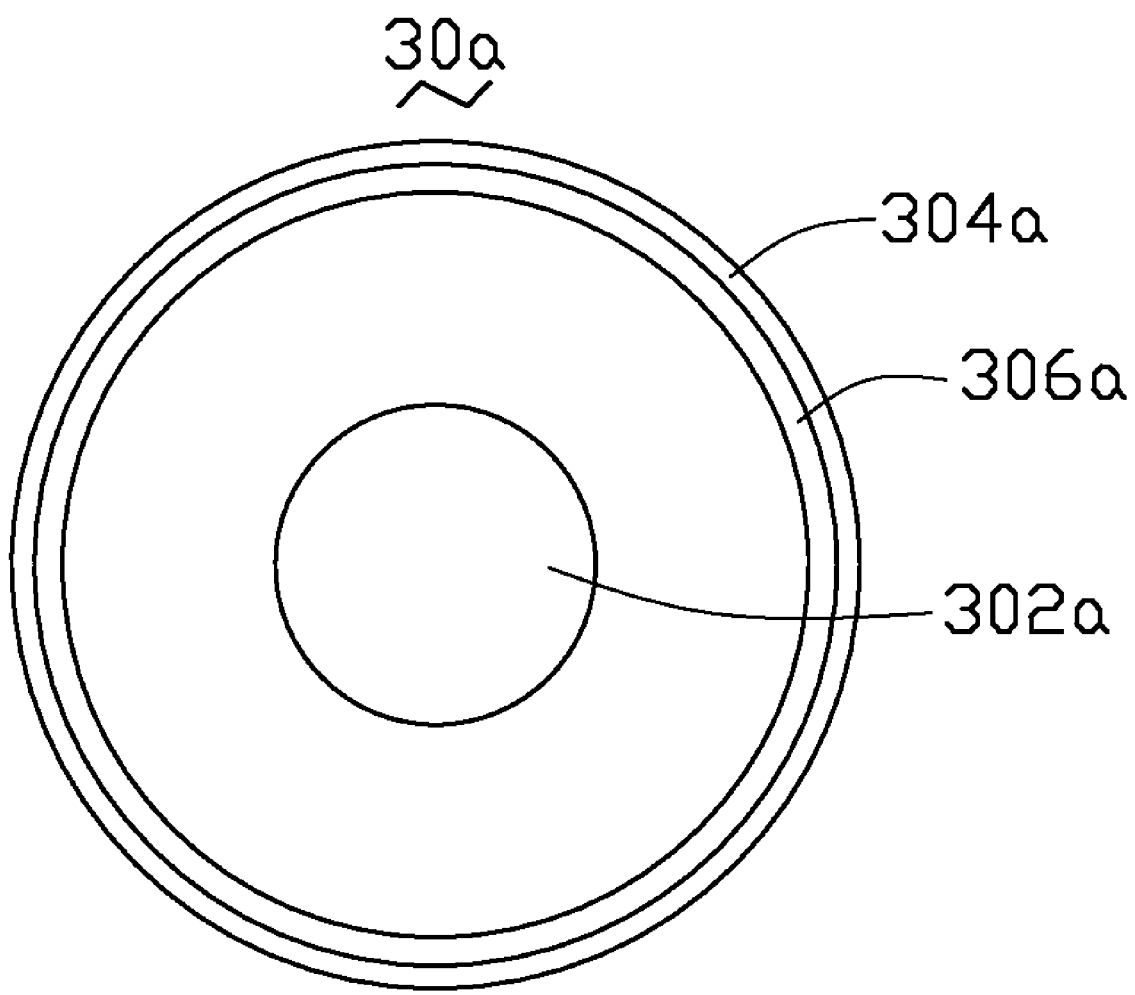
FIG. 2 is a top view of a third lens of a second embodiment of a lens module for a portable electronic device.

FIG. 2 is a top view of a third lens 30a of a second embodiment of a lens module for a portable electronic device. The third lens 30a comprises an optical member 302a and a non-optical member 304a. The third lens 30a differs from the third lens 30 in that the non-optical member 304a includes an annular recess 306a surrounding the optical member 302a. The second end of the barrel has an annular protrusion matching the annular recess 306a to compactly couple the barrel with the third lens 30a. Accordingly, the annular recess 306a can be a fastening member of the third lens 30a. It is understood that the non-optical member 304a can be an annular protrusion surrounding the optical member 302a, and the second end of the barrel has an annular recess matching the optical member 302a correspondingly.

Figure 3:
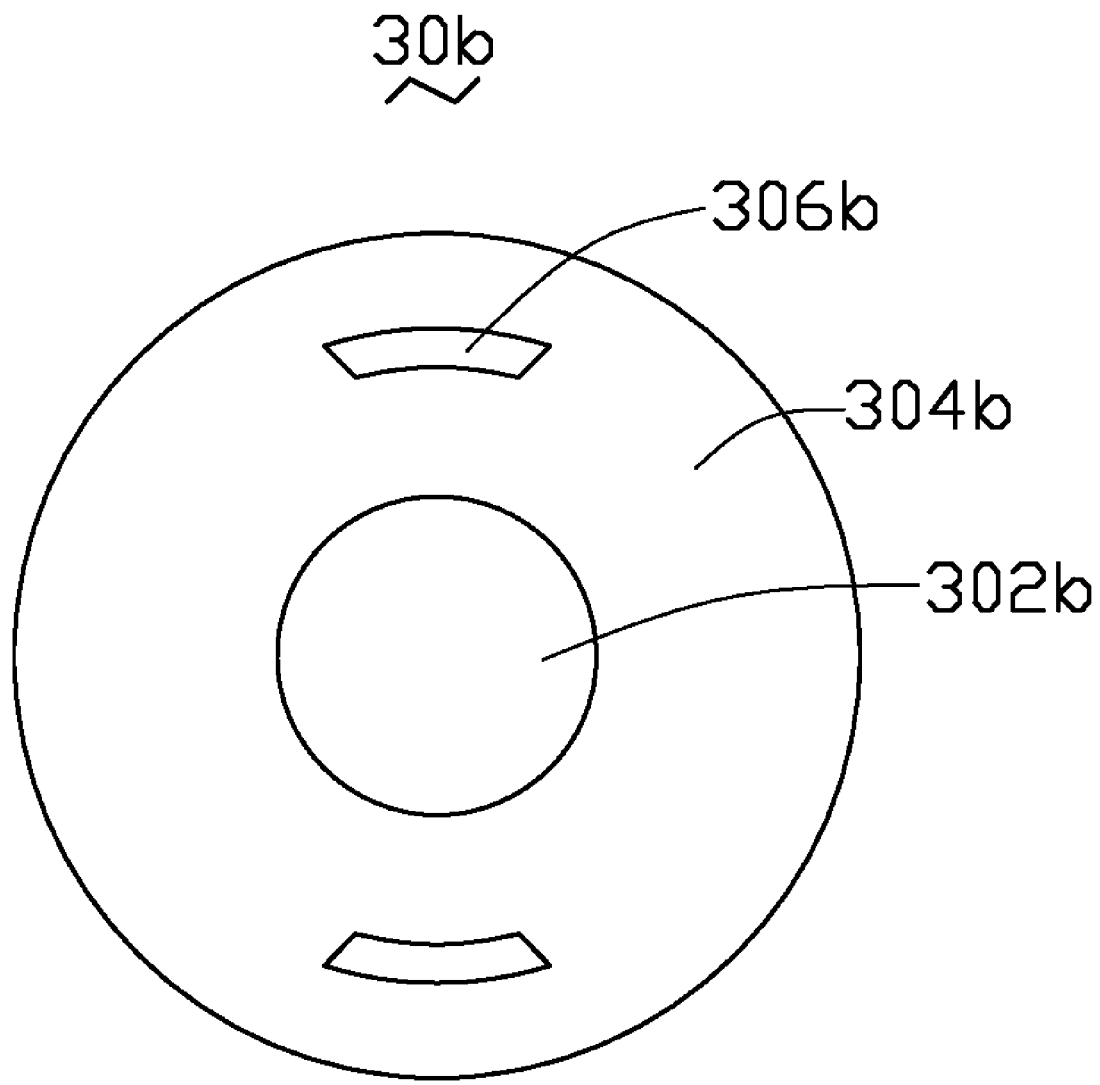
FIG. 3 is a top view of a third lens of a third embodiment of a lens module for a portable electronic device.

FIG. 3 is a top view of a third lens 30b of a third embodiment of a lens module for a portable electronic device. The third lens 30b comprises an optical member 302b and a non-optical member 304b. The third lens 30b differs from the third lens 30 in that the non-optical member 304b includes two curved recesses 306b surrounding the optical member 302b, spaced apart. The second end of the barrel has two curved protrusions matching the curve recess 306b to compactly couple the barrel with the third lens 30b. It is understood that the curve shape can be modified to a rectangle, a triangle, a pentagon, or other geometric shapes. In the illustrated embodiment, the curve recess 306b can be a fastening member of the third lens 30b. The curve recess 306b also can be a through hole. It is understood that the number of recesses in this embodiment are presented as an example only, and not as a limitation to the disclosure, and the second end of the barrel has protrusions in a quantity corresponding to the number of curved recesses, to match the optical member 302b.

Figure 4:
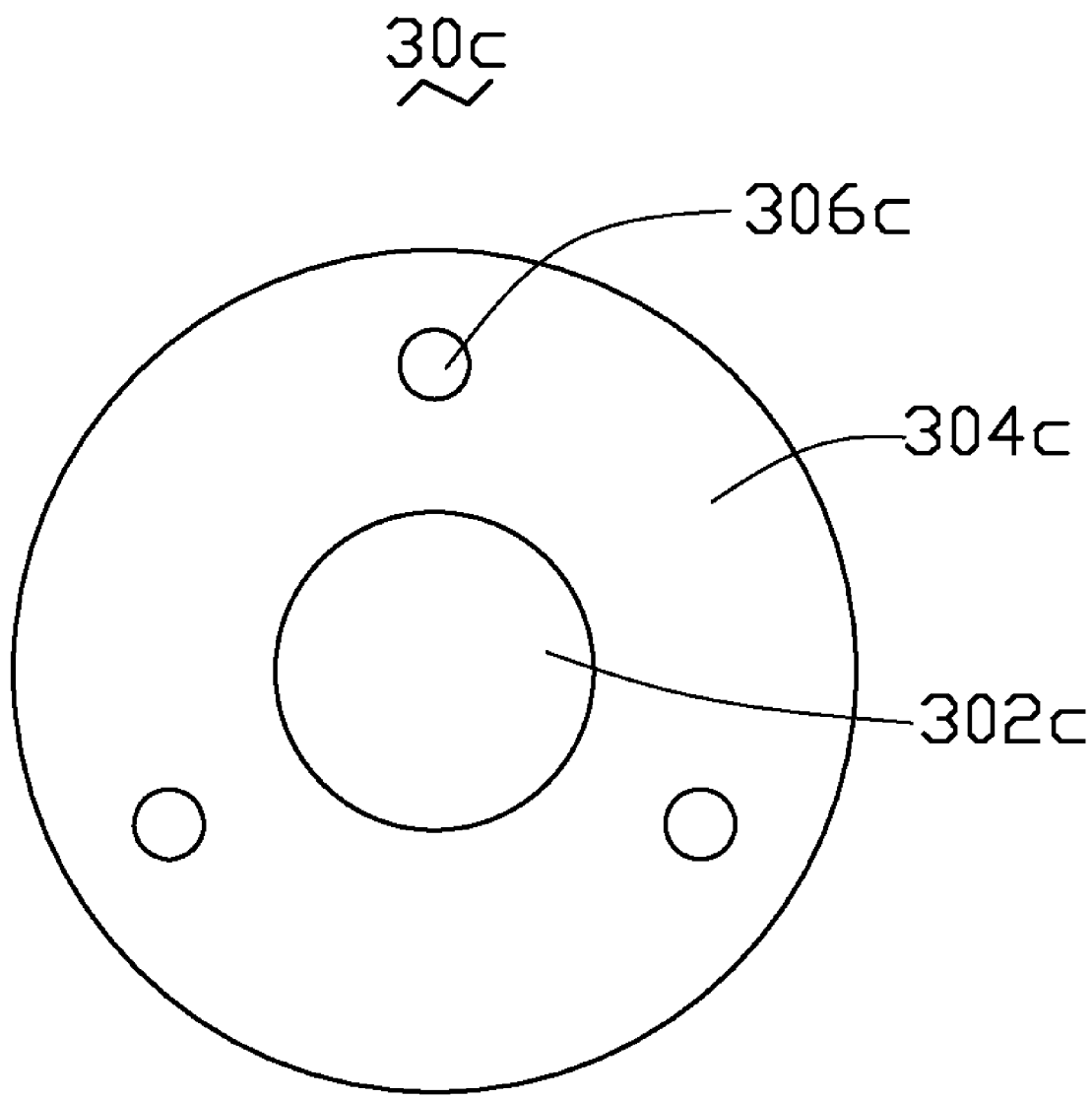
FIG. 4 is a top view of a third lens of a fourth embodiment of a lens module for a portable electronic device.

FIG. 4 is a top view of a third lens of a fourth embodiment of a lens module 30c for a portable electronic device. The third lens 30c comprises an optical member 302c and a non-optical member 304c. The third lens 30c differs from the third lens 30 in that the non-optical member 304c includes three round recesses 306c surrounding the optical member 302c, spaced apart. The second end of the barrel has three round protrusions matching the round recesses 306c to compactly couple the barrel with the third lens 30c.

Figure 5:
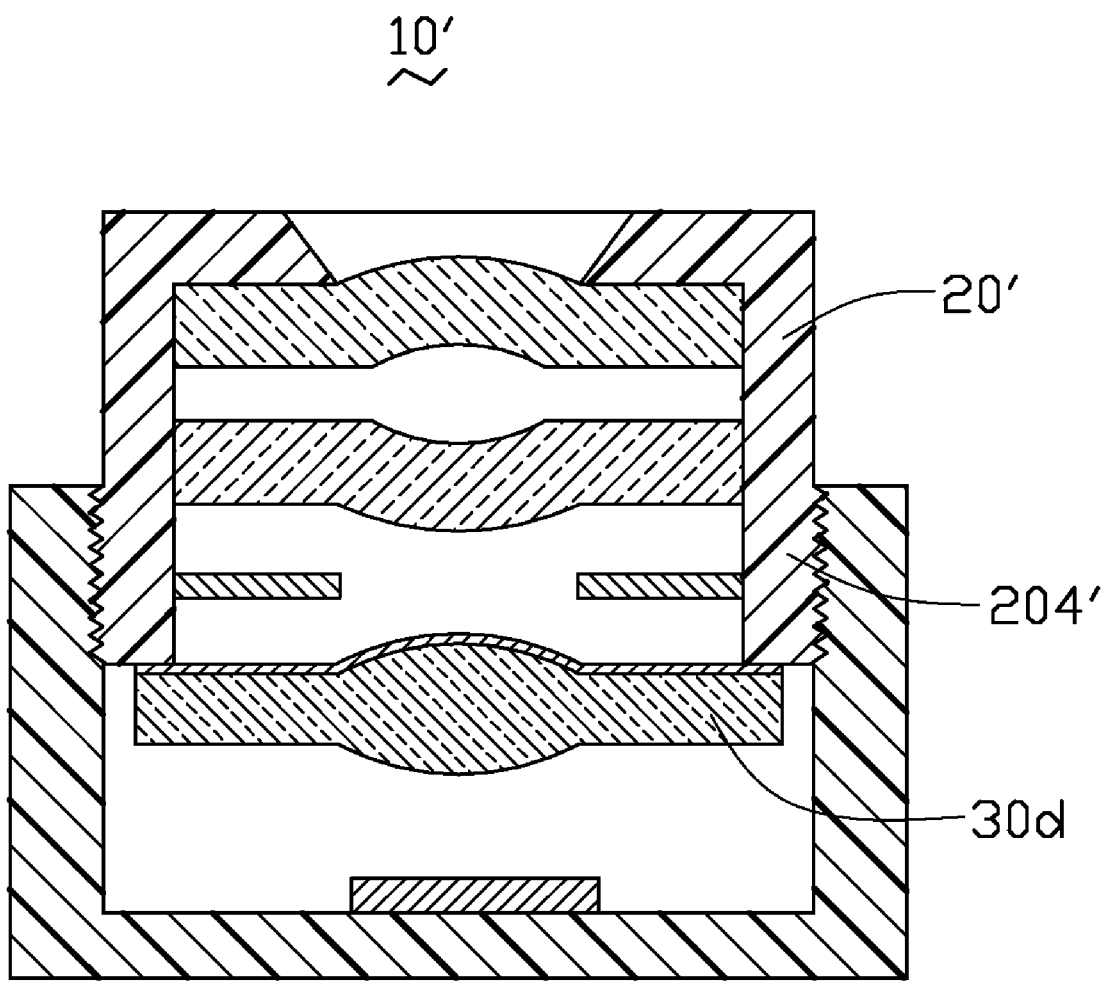
FIG. 5 is a cross-section of a fifth embodiment of a lens module for a portable electronic device.

FIG. 5 is a cross-section of a fifth embodiment of a lens module 10' for a portable electronic device. The lens module 10' comprises a barrel 20', a second end 204' provided on the barrel 20', and a third lens 30*d* provided on the second end 20'. The lens module 10' differs from the lens module 10 in that the barrel 20*d* has no engaging member, and the third lens 30*d* has no fastening part. The third lens 30*d* is fixed to the second end 204' of the barrel 20' by an adhesive.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module for a portable electronic device, comprising:
    a barrel with two ends;
    a first lens and a second lens received in the barrel; and
    a third lens positioned proximal to one end of the barrel, the third lens comprising a fastening member;
    the barrel comprising an engaging member, positioned proximal to the end of the barrel and accommodated with the fastening member, to compactly couple the third lens with the end of the barrel, a part of the third lens exceeding the end of the barrel.

2. The lens module as claimed in claim 1, wherein the fastening member of the third lens is an annular protrusion, and the engaging member of the barrel comprises an annular recess.

3. The lens module as claimed in claim 1, wherein the fastening member of the third lens comprises annular rectangle-shaped protrusions, and the engaging member of the barrel comprises annular rectangle-shaped recesses.

4. The lens module as claimed in claim 1, wherein the fastening member of the third lens comprises an annular recess, and the engaging member of the barrel is an annular protrusion.

5. The lens module as claimed in claim 1, wherein the fastening member of the third lens comprises at least two spaced recesses, the engaging member of the barrel comprises at least two spaced protrusions, and the number and position of the protrusions correspond to the number and position of the recesses.

6. The lens module as claimed in claim 1, wherein the fastening member of the third lens comprises at least two spaced protrusions, the engaging member of the barrel comprises at least two spaced recesses, and the number and position of the recesses correspond to the number and position of the protrusions.

7. The lens module as claimed in claim 1, wherein the fastening member of the third lens comprises at least two spaced through holes, the engaging member of the barrel comprises at least two spaced protrusions, and the number and position of the protrusions correspond to the number and position of the through holes.

8. The lens module as claimed in claim 1, wherein an infrared cutting film is provided on a surface of the third lens.

9. The lens module as claimed in claim 1, wherein the third lens is a bi-aspherical lens.

10. The lens module as claimed in claim 1, further comprising a view stop received in the barrel between the second lens and the third lens.

11. The lens module as claimed in claim 1, further comprising a holder receiving the barrel.

12. A lens module for a portable electronic device, comprising:
    a barrel with two ends;
    a first lens and a second lens received in the barrel;
    a third lens positioned proximal to one end of the barrel, wherein the third lens is fixed on the one end of the barrel by an adhesive, and the third lens is not received in the barrel.

* * * * *